Feb. 18, 1958    H. E. ROBERTS    2,824,211
RESISTANCE WELDING

Filed July 6, 1955    2 Sheets-Sheet 1

INVENTOR.
HOWARD E. ROBERTS
BY Campbell, Brumbaugh, Free & Graves
his ATTORNEYS

Feb. 18, 1958 H. E. ROBERTS 2,824,211
RESISTANCE WELDING
Filed July 6, 1955 2 Sheets-Sheet 2

INVENTOR.
HOWARD E. ROBERTS
BY
Campbell, Brumbaugh, Free & Graves
his ATTORNEYS

United States Patent Office 2,824,211
Patented Feb. 18, 1958

2,824,211
RESISTANCE WELDING

Howard E. Roberts, Palos Verdes Estates, Calif., assignor to Fairchild Engine and Airplane Corporation, Hagerstown, Md., a corporation of Maryland Application July 6, 1955, Serial No. 520,178

6 Claims. (Cl. 219—104)

This invention relates to the resistance welding of thin walled metal tubes to thicker metal plates and, more particularly, to the construction of heat exchangers embodying these elements.

It has proven difficult to provide an efficient weld between thin walled tubes abutting thicker plates, this being necessary in various structures such, for example, as heat exchangers. Thus, such welded joints fail to withstand the stresses and vibrations to which they may be subjected in certain environments.

The present invention provides methods for welding thin walled metal tubes to thicker metal plates which result in a completed structure of great strength and rigidity, this structure being resistant to strong vibratory and other forces such as may be encountered in certain applications such, for example, as in aircraft use. The foregoing is achieved by providing an opening in the thicker plate or header of a diameter equal to the inside diameter of the tube which must be welded in abutment thereto. The thin walled tube and plate are held in alignment by means of a nonconductive rod extending between the tube and the orifice. A welding electrode may then be urged against the plate and another welding electrode electrically connected to the tube, the passage of current between the electrodes fusing the members at their abutment. The tube and plate are moved together during the welding process to forge the fused metal. Where two plates must be welded to opposite ends of the tube, the welding electrodes are abutted against the plates and welding current passed therebetween. This simultaneously completes the welds at the abutting surfaces at each end of the tube.

The plate opening may be either in the form of a simple hole through the plate or an inwardly projecting orifice, an annular surface at the mouth of the orifice being adapted to engage and be welded to the end edge of the tube.

In a preferred embodiment of the invention, a thin layer of high conductivity metal coats the plate surface engaging the electrode and the outer surface of the tube, the metal layer on the tube being spaced from the tube end engaging the plate.

These and further advantages of the invention will be more readily understood when the following description is read in connection with the accompanying drawings in which.

Figure 1:
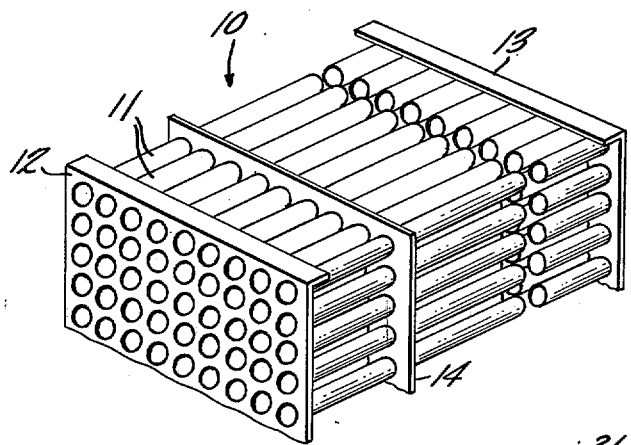
Figure 1 is a view in perspective of a portion of a heat exchanger which may be constructed in accordance with the principles of the present invention.

Referring to the invention in greater detail with particular reference to Figure 1, a heat exchanger 10 is built up of a number of thin walled tubes 11 joined at their ends in abutment to headers 12 and 13, stiffeners 14 being provided on the tubes 11 between the headers. It will be apparent that each of the tubes 11 must be efficiently welded to the headers 12 and 13 if the resultant heat exchanger 10 is to possess the desired characteristics of great strength, rigidity and resistance to heavy vibrations.

Figure 2:
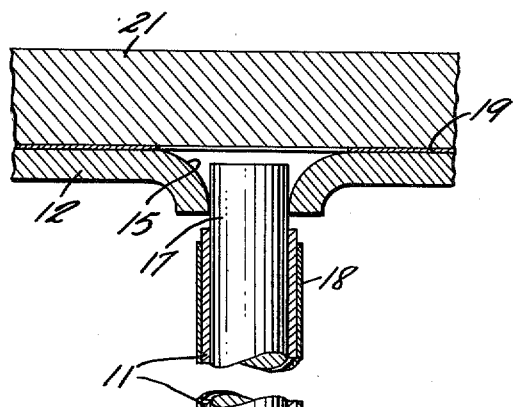
Figure 2 is a cross section taken axially of a thin walled tube illustrating the orientation of thicker plates and welding components prior to the welding operations.

Examining Figure 2, inwardly projecting orifices 15 and 16 have been respectively formed in the headers 12 and 13, the ends of a nonconductive alignment rod 17 closely fitting the tube 11 being positioned therein. Obviously, a pair of shorter alignment rods may be substituted for the rod 17 if desired. A thin layer 18 of a high conductivity metal such, for example, as copper or silver is coated on the exterior surfaces of the tube 11 extending to points spaced a short distance from the tube ends. The high conductivity layer 18 permits the tube 11 to carry a far greater current than a similar uncoated tube to facilitate the welding operation. The principles underlying the use of high conductivity layers of metal in connection with resistance welding have been fully set forth in copending applications Serial Nos. 449,306, filed August 12, 1954, and 560,371 filed January 20, 1956, by James R. Campbell.

The horizontal surfaces of the headers 12 and 13 also respectively carry thin layers 19 and 20 of high conductivity metal. This construction minimizes arcing or localized burning between welding electrodes 21 and 22 and the respective headers 12 and 13 which they engage.

It will be understood that while Figure 2 illustrates a single tube 11 positioned between the headers 12 and 13, it is general practice to so position a plurality of tubes to permit their simultaneous or sequential welding to the headers, depending upon the type of welding electrodes 21 and 22 utilized.

In a typical operation for welding the headers 12 and 13 to the tube 11, the electrodes 21 and 22 are moved together by suitable means to urge the annular end faces of the orifices 15 and 16 against the end faces of the tube 11. Subsequent to this operation, high density welding current flows between the electrodes 21 and 22. The high contact resistance at the abutment of the headers 12 and 13 and the tube 11 added to the high resistance of the unplated end portions of the tube 11 results in heating and fusion of the engaging metal surfaces. During the passage of such welding current, the electrodes 21 and 22 are moved together to forge the fused metal as shown at 23 in Figure 3. Subsequently, the rod 17 may be removed from the tube 11.

It will be noted that the fused area 23 does not extend to the layer 18 in this instance although under certain circumstances, it has been found desirable to forge the fused metal to bring the layer 18 into contact with the headers 12 and 13 or the fused area, this resulting in a heavier flow of current between the electrodes 21 and 22 which further heats the headers 12 and 13. This is fully discussed in the above-mentioned Campbell applications.

While convergent movement of the electrodes 21 and 22 has been discussed in connection with welding the tubes 11 to the headers 12 and 13, it should be understood that roller type electrodes which, while advancing, urge the headers 12 and 13 together and fuse and forge the components may be employed with similar results.

Figure 3:
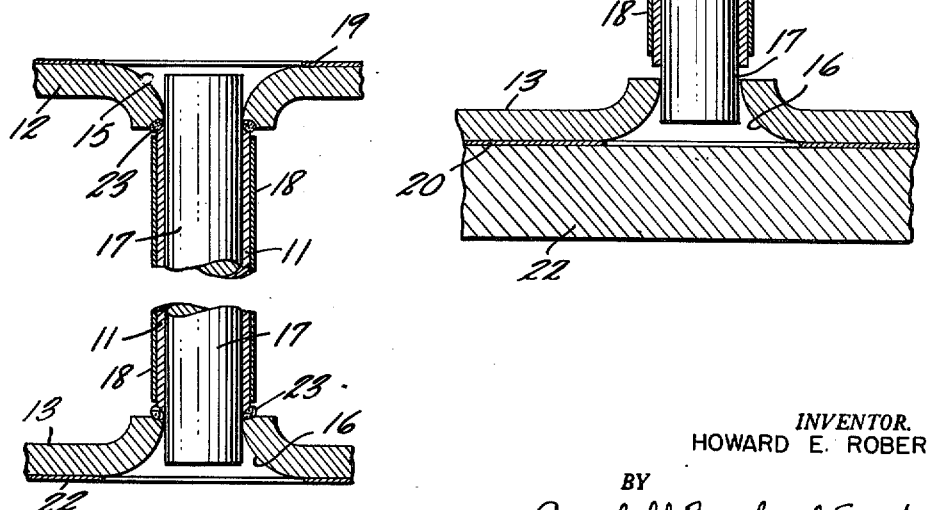
Figure 3 is a cross section similar to Figure 2 showing the completed weld.
Figure 4:
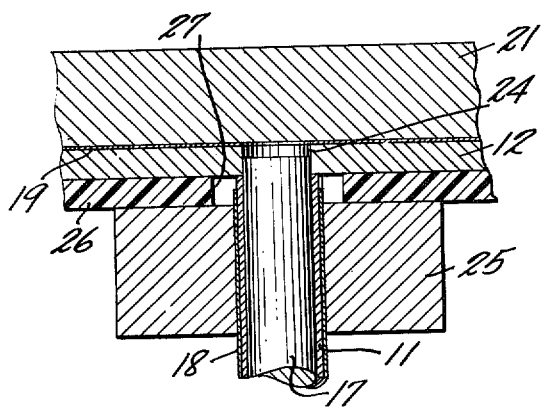
Figure 4 is a cross section taken axially of a thin walled tube illustrating in another embodiment of the invention the positioning of a thicker plate and welding components prior to the welding steps.

A modified form of the invention is illustrated in Figure 4 and components similar to those found in Figures 2 and 3 are designated by the same reference characters. The header 12 is provided with an opening 24 whose diameter matches the inside diameter of the tube 11. As in Figure 2, a nonconducting alignment rod 17 closely fits the tube 11 and extends into the opening 24 to guide the header 12 and tube 11 into proper engagement for the welding operations. The electrode 21 engages the thin layer 19 on the header 12 while another electrode 25 engages the thin layer 18 on the tube 11 either by being clamped thereto or by a mercury bath type of contact, either of the foregoing affording an excellent electrical connection between the two elements. In the event the electrode 25 is not clamped to the tube 11, a suitable fixture must be employed to prevent movement of the tube 11.

A sheet of insulation 26 is preferably provided on the underside of the header 12 to suitably position the electrode 25, the sheet 26 carrying a cutaway area 27 around the opening 24 to prevent interference with the fusing and forging actions taking place during the welding operations.

After the electrodes 21 and 25 are urged together to position the tube 11 and the header 12 as shown in Figure 4, a high density welding current may be provided between the electrodes 21 and 25. This results in heating and fusion at the junction of the tube 11 and header 12 due to their contact resistance and the uncoated area of the tube 11. During the passage of the welding current, the electrodes 21 and 25 are further moved together in order to forge the fused metal, the resultant weld 28 being illustrated in Figure 5.

If desired, the positioning of the welding electrodes illustrated in Figures 2 and 3 may be employed with the header 12 and an additional header at the other end of the tube 11 illustrated in Figure 4 and in this instance, the insulation material 27 may, of course, be omitted. It should also be noted that if it is desirable to weld only the orifice 15 to the tube 11 in Figure 2, an electrode similar to the electrode 25 may be connected to the tube 11 as shown in Figure 4 and the welding operations discussed in Figure 4 followed.

Figure 6:
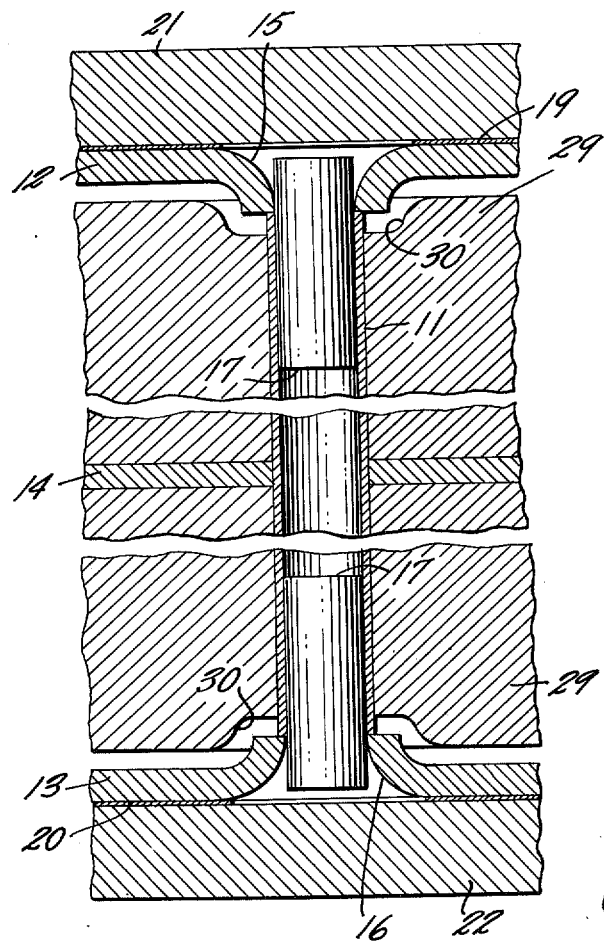
Figure 6 is a cross section taken axially of a thin walled tube through a portion of a heat exchanger showing the manner in which the heat exchanger may be constructed employing the principles of the present invention.

It may be desirable in certain instances to assemble the heat exchanger 10 or portions thereof prior to welding the tubes 11 in abutment to the headers 12 and 13. This may be accomplished by supporting the tubes 11 and the stiffeners 14 by means of a conductive matrix 29 formed of a dissolvable material, as shown in Figure 6. Thus, the conductive matrix 29 is formed about the tubes 11 and the stiffeners 14 and extends just short of the welded position of the headers 12 and 13. Annular chambers 30 are provided to accommodate each of the orifices 15 and 16.

One manner in which the matrix 29 may be properly formed is by first threading the stiffeners 14 on the tubes 11 and then inserting the tube ends into a pair of dummy headers (not shown). A suitable mold framework (not shown) may be utilized to support the stiffener plates 14 in their proper position. The dummy headers must extend slightly further inwardly than the welded positions of the headers 12 and 13, nipples being incorporated around each tube end to produce the chambers 30 in the cast matrix 29. With the foregoing components assembled, the conductive material chosen to form the matrix 29 is cast according to conventional practices and the mold shell and dummy headers removed. The nonconducting positioning rods 17 are then inserted through the orifices 15 and 16 into the ends of the tubes 11 and a high density welding current passed between the electrodes 21 and 22. As the abutting surfaces are heated and fused, the headers 12 and 13 are moved together to forge the fused areas, as described in connection with Figures 2 and 3. However, when a conductive matrix 29 is employed, the thin layer of highly conductive material 18 (Figure 2) may be omitted from the tubes 11 since the matrix 29 will bypass welding current and prevent overheating of the thin walled tubes 11. Of course, if a nonconductive matrix is employed, the conductive coating 18 would be retained on the tubes 11. Subsequent to welding the headers 12 and 13 to the tubes 11, the martix 29 is removed by suitable dissolving or melting processes, the term dissolvable encompassing both processes.

Figure 5:
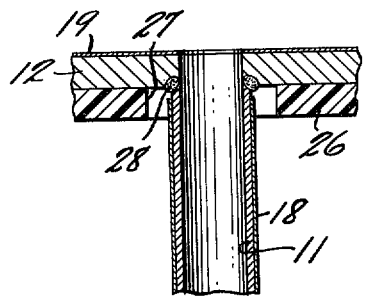
Figure 5 is a cross section similar to Figure 4 showing the completed weld.

Obviously, the matrix 29 may be employed in manufacturing a heat exchanger in which the tubes 11 are welded to the headers 12 and 13 when merely an opening 24, as discussed in connection with Figures 4 and 5, has been provided in the headers.

It will be apparent from the foregoing that the present invention provides a strong and efficient weld joint between thin walled tubes and thicker plates, this being accomplished with a minimum number of welding tools which may be readily manipulated by a relatively unskilled operator. Obviously, the above described embodiments of the invention are illustrative only and modifications thereof will occur to those skilled in the art. Therefore, this invention is not to be limited to the specific apparatus disclosed herein but is to be defined by the appended claims.

I claim:

1. A method of welding a thin walled metal tube to a thicker metal plate comprising the steps of forming in the plate an opening having a diameter substantially equal to the inner tube diameter, inserting a nonconductive alignment rod in the tube and the opening to support the tube and the plate in fixed relation with one tube end engaging an annular surface on the plate closely surrounding and in contact with a surface defining the interior of the opening, abutting one welding electrode against the plate, electrically connecting another welding electrode to the tube, passing a high density welding current between the welding electrodes to soften and fuse the metal at the abutment of the tube and the plate, and relatively moving the plate and the tube together to forge the fused metal.

2. A method of welding a thin walled metal tube to a thicker metal plate comprising the steps of punching in the plate an orifice extending from the plate having a diameter substantially equal to the inner tube diameter, inserting a nonconductive alignment rod in the tube and the orifice to support the tube and the plate in fixed relation with one tube end engaging an annular surface on the end of the orifice surrounding and in contact with a surface defining the interior of the orifice, abutting one welding electrode against the outer surface of the plate, electrically connecting another welding electrode to the tube, passing a high density welding current between the welding electrodes to soften and fuse the metal at the abutment of the tube and the plate, and relatively moving the plate and the tube together to forge the fused metal.

3. A method of welding a thin walled metal tube to a pair of thicker metal plates comprising the steps of forming in each of the plates openings having a diameter substantially equal to the inner tube diameter, inserting nonconductive alignment rod means in the tube and the openings to support the tube and the plates in fixed relation with each tube end engaging an annular surface on one of the plates closely surrounding and in contact with a surface defining the interior of the opening, abutting a welding electrode against the outer surface of each plate, passing a high density welding current between the welding electrodes to soften and fuse the metal at the abutments of the tube and the plates, and moving the plates together to forge the fused metal.

4. A method of welding a thin welded metal tube to a pair of thicker metal plates comprising the steps of punching in each of the plates orifices extending from the plates and each having a diameter substantially equal to the inner tube diameter, inserting nonconductive alignment rod means in the tube and the orifices to support the tube and the plate in fixed relation with each tube end engaging an annular surface on the end of one of the orifices closely surrounding and in contact with a surface defining the interior of the orifice, abutting a welding electrode against the outer surface of each plate, passing a high density welding current between the welding electrodes to soften and fuse the metal at the abutments of the tube and the plates, and moving the plates together to forge the fused metal.

5. A method of welding thin walled tubes to thicker headers to form a heat exchanger comprising the steps of positioning at least one stiffening plate on the tubes, providing a dissolvable conductive matrix enclosing and positioning the tubes and the stiffeners spaced from the headers, forming in each of the headers openings having a diameter substantially equal to the inner tube diameter, inserting a nonconductive alignment rod in each tube end and the corresponding opening to support the tube in the header in fixed relation with one end of the tube engaging an annular surface on the header closely surrounding and in contact with a surface defining the interior of the opening, abutting a welding electrode against the outer surface of each header, passing high density welding current between the welding electrodes to soften and fuse the metal at the abutment of the tubes and the headers, and moving the headers together to forge the fused metal.

6. A method of welding thin walled tubes to thicker headers to form a heat exchanger comprising the steps of positioning at least one stiffening plate on the tubes, providing a dissolvable matrix enclosing and positioning the tubes and the stiffeners spaced from the headers, forming in each of the headers openings having a diameter substantially equal to the inner tube diameter, inserting a nonconductive alignment rod in each tube and in the corresponding opening to support the tube and the header in fixed relation with one end of the tube engaging an annular surface on the header closely surrounding and in contact with a surface defining the interior of the opening, abutting a welding electrode against the outer surface of each header, passing high density welding current between the welding electrodes to soften and fuse the metal at the abutment of the tubes and the headers, and moving the headers together to forge the fused metal.

References Cited in the file of this patent

UNITED STATES PATENTS

| Number | Name | Date |
|---|---|---|
| 1,212,804 | Murray | Jan. 16, 1917 |
| 1,215,965 | Murray | Feb. 13, 1917 |
| 1,893,270 | Caldwell | Jan. 3, 1933 |
| 1,898,713 | Carrier et al. | Feb. 21, 1933 |
| 2,245,298 | Proctor | June 10, 1941 |
| 2,320,920 | Fletcher | June 1, 1943 |
| 2,437,740 | Haynes | Mar. 16, 1948 |
| 2,467,391 | Kerr et al. | Apr. 19, 1949 |
| 2,488,627 | Hisey | Nov. 22, 1949 |
| 2,614,198 | Avery et al. | Oct. 14, 1952 |

FOREIGN PATENTS

| Number | Country | Date |
|---|---|---|
| 385,391 | Germany | Nov. 23, 1923 |

U. S. DEPARTMENT OF COMMERCE
PATENT OFFICE

CERTIFICATE OF CORRECTION

Patent No. 2,824,211                                                February 18, 1958

Howard E. Roberts

It is hereby certified that error appears in the printed specification of the above numbered patent requiring correction and that the said Letters Patent should read as corrected below.

Column 5, line 1, for "welded" read -- walled --.

Signed and sealed this 15th day of April 1958.

(SEAL)
Attest:
KARL H. AXLINE
Attesting Officer

ROBERT C. WATSON
Commissioner of Patents